W. FULLARD.
DRIER, COOKER, AND BAKER FOR FOODS.
APPLICATION FILED FEB. 23, 1916.

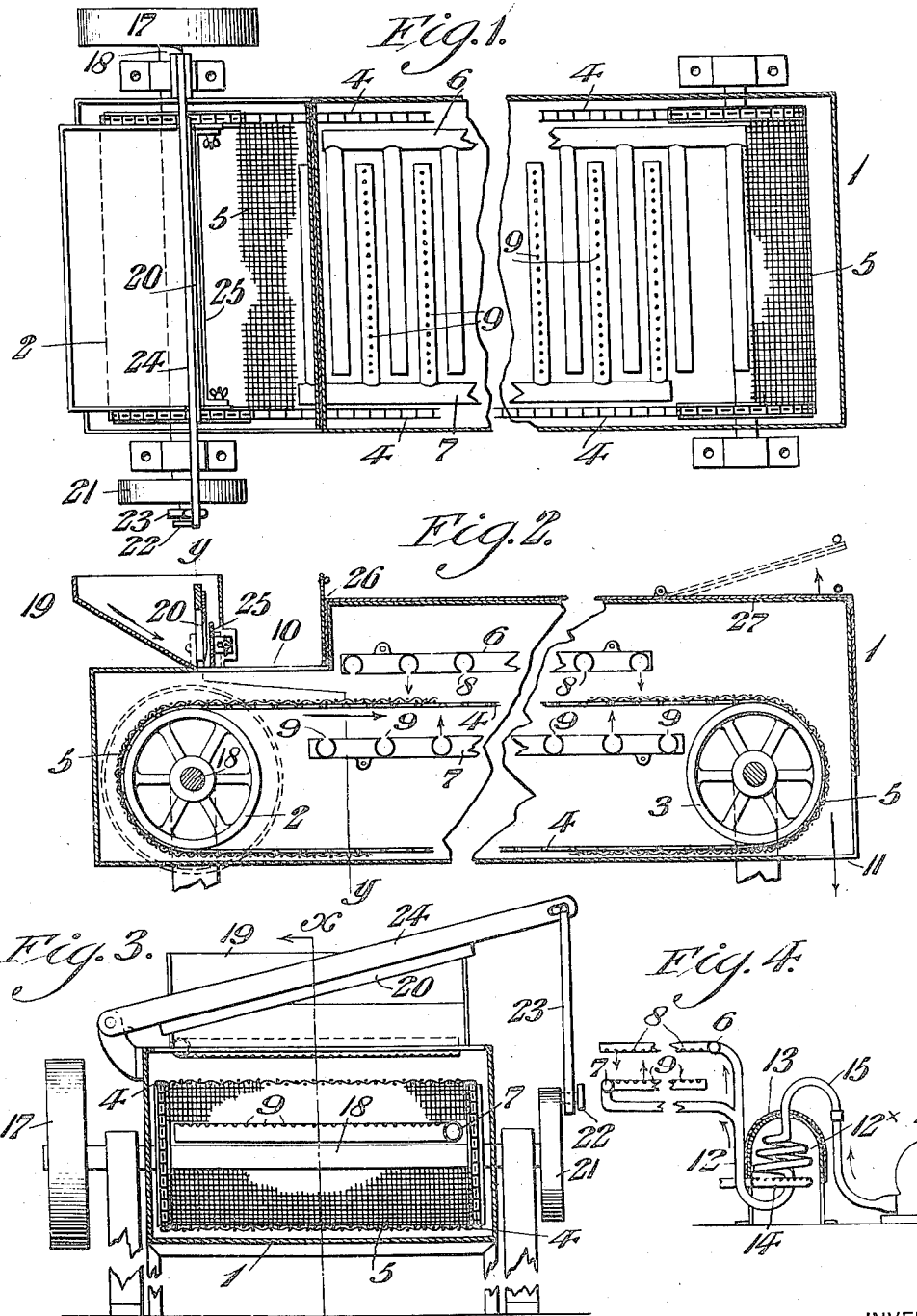

1,231,594.

Patented July 3, 1917.

WITNESSES

INVENTOR
William Fullard
BY
ATTORNEYS

UNITED STATES PATENT OFFICE.

WILLIAM FULLARD, OF BURLINGTON, NEW JERSEY.

DRIER, COOKER, AND BAKER FOR FOODS.

1,231,594.

Specification of Letters Patent.

Patented July 3, 1917.

Application filed February 23, 1916. Serial No. 79,895.

*To all whom it may concern:*

Be it known that I, WILLIAM FULLARD, a citizen of the United States, residing in the city and county of Burlington, State of New Jersey, have invented a new and useful Drier, Cooker, and Baker for Foods, of which the following is a specification.

My invention consists of a device for drying vegetables, fruit, etc., baking, roasting and cooking food and other articles, the same embodying means where such goods or articles will be subjected to heated fresh air simultaneously on both sides thereof, and so effectively and uniformly dried, baked, cooked, etc.

The invention is satisfactorily illustrated in the accompanying drawing, but the important instrumentalities thereof may be varied, as long as they are included in the scope of the claims.

Figure 1 represents a partial longitudinal horizontal section, and a partial plan view of a device for drying, etc., embodying my invention.

Fig. 2 represents a longitudinal vertical section thereof on the line $x-x$ Fig. 3.

Fig. 3 represents a transverse vertical section on the line $y-y$ of Fig. 2.

Fig. 4 represents a partial transverse section, and a partial elevation of the heat producing mechanism for the device on a reduced scale.

Similar numerals of reference indicate corresponding parts in the figures.

Figure 5:
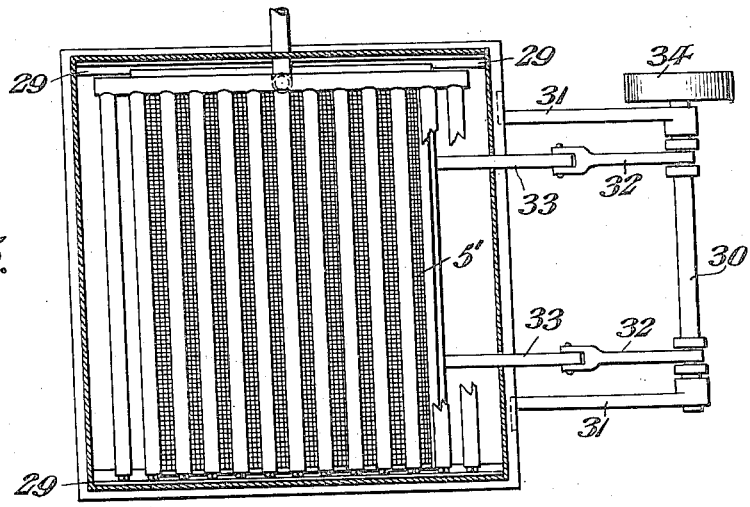
Figs. 5, 6, 7, 8 and 9 represent views of other embodiments of my invention.

Referring to the drawings, 1 designates an oven in which are mounted on opposite ends thereof the rollers 2 and 3 around which are run the endless chains or flexible or articulated conveyers 4 to which is attached the endless apron forming a traveling or movable support 5, composed of a body of reticulated gauze or other open work through which heat may be directed and circulate in opposite directions.

Above and below said pan are the heat-receiving pipes 6 and 7 which are properly supported on the walls of the oven. The pipes 6 have jet openings 8 in their lower portions, and the pipes 7 have jet openings 9 in their upper portions, whereby hot air from said pipes will be ejected therefrom respectively to the upper and lower faces of said support 5, and consequently upon the goods or material placed thereon on the top and bottom thereof. The pipes 6 and 7 extend longitudinally and transversely, the jet openings 8 and 9 being in the transversely-extending pipes, which latter and their jet openings alternate on opposite side pipes, so as to produce the best effects of injecting the heated fresh atmospheric air at different places upon opposite surfaces of the goods or material acted upon.

The oven has in its upper wall an inlet 10 for supplying the support 5 with goods or material, and in a suitable portion opposite to said inlet an outlet 11 for discharging said goods in dried or baked condition.

In order to supply the pipes 6 and 7 with hot fresh air there is connected with the same and confluent therewith the pipe 12 which enters the hood or casing 13, where it is continued in the form of a coil $12^x$, below which or adjacent to it is the burner 14, to which gas is supplied in any suitable manner.

Continuous of the coil $12^x$ is the pipe 15 which extends outside of the hood 13 and joins the casing of the blower 16 whereby air will be driven into the coil $12^x$, and as the gas of the burner 14 is ignited directly or indirectly fresh air from the atmosphere will be highly heated and directed to the pipes 6 and 7 and ejected forcibly therefrom against the goods or material on opposite sides thereof, the heat circulating through the open-work support 5 and in the oven, thus effectively drying or baking the goods or material, it being noticed that motion is imparted to the support 5 by the driving pulley 17 and its shaft 18, which shaft is mounted on the sides of the oven, and which pulley receives power in any suitable manner, it being evident that the support traverses the oven and so subjects the goods or material gradually and successively to the heat as aforesaid from the inlet to the outlet of the oven, thus effectively and uniformly drying or baking said goods or material, and as evident on both sides thereof.

Should it be desired to slice or cut the goods or material preparatory to introducing them into the oven at the inlet 9, I employ the hopper 19 which is supported on the oven adjacent to said inlet, and has its bottom open in communication with said inlet. A blade or knife 20 is adapted to enter said hopper and receive up and down motions by the driving pulley 21, which receives motion in any suitable manner, and has eccentrically thereon the wrist pin 22 on which is mounted the lower end of the connecting rod 23, the upper end whereof is pivotally connected with the head 24 of the blade or cutter 20, whereby the latter is lowered and raised and so reaches the goods or material in the hopper so as to slice, cut or sever the same, after which the resultant pieces or sections drop through the inlet 10, into the oven upon the traveling support 5 where they are dried, or baked, as in the previous instance.

The hopper has therein at the base thereof adjacent to the path of the blade or cutter 20, the adjustable gage 25 to regulate the lengths or sections of the pieces of goods or material sliced, cut or severed.

The inlet 10 will be closed by the lid or door 26, so as to retain the heat in the oven, and access to the interior of the latter may be had through the lid or door 27, in the present case, at the top of the oven.

Figure 6:
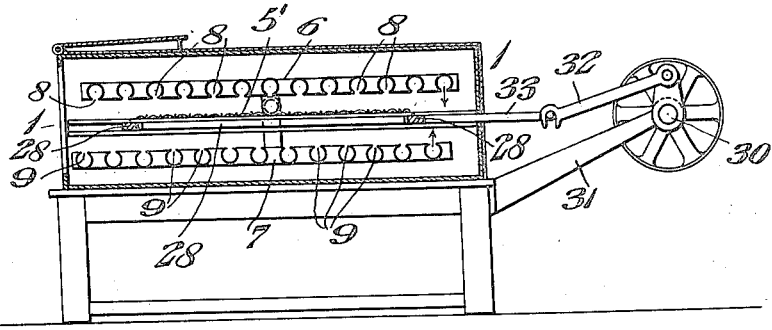
Figure 9:
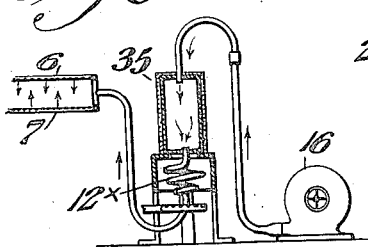
Figure 7:
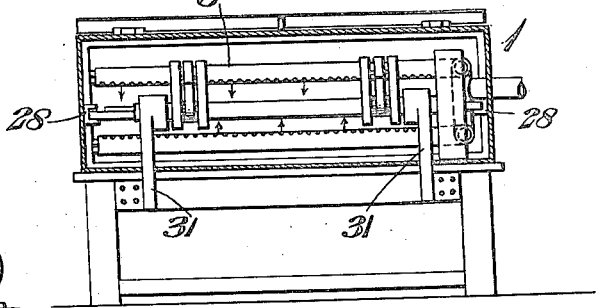
Figure 8:
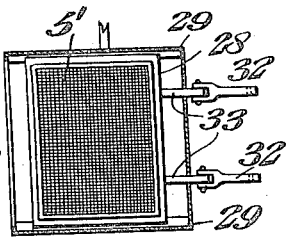

In Figs. 5, 6, 7, 8 and 9 I show a reciprocating pan 28 adapted to carry the support 5, it being mounted slidably on the ways 29 and receiving motion from the crank shaft 30, whose bearings 31 are connected with the supporting frame of the oven, said shaft 30 having mounted on it the connecting rods 32, to which are jointed the rods 33, said crank shaft carrying the driving pulley 34 which is adapted to receive power from any suitable source.

The air heater has a chamber 35 intermediate of the coil $12^x$ and blower 16, to receive a large volume of air under pressure, prior to entering said coil, thus directing greater quantities of hot air with increased force to the support and the interior of the oven.

Having thus described my invention what I claim as new and desire to secure by Letters Patent, is:—

1. In a device for drying, baking, cooking, etc., an oven, an open work support therein for the article or material to be acted upon, and pipes within said oven upon opposite sides of said support and provided with oppositely directed discharge openings for directing hot air against opposite sides of said support, said pipes with their openings being alternately arranged.

2. In a device for drying, baking, cooking, etc., an oven, a movable open work support therein, transversely disposed pipes upon opposite sides of said support having oppositely disposed openings for directing hot air against opposite sides of said support, a blower, and means intermediate said blower and pipes for heating fresh atmospheric air prior to its delivery to said pipes, said blower directing the heated atmospheric air to said pipes and injecting it therefrom through said openings.

3. In a device for drying, baking, cooking, etc., an oven, a support of open material therein for the article to be treated, means for giving motion to said support, pipes disposed lengthwise of said support, alternately arranged oppositely extended pipes leading from the first-named pipes and provided with perforations upon their adjacent faces upon opposite sides of said support, and means for supplying heated fresh air to said pipes.

4. In a device for drying, baking, cooking, etc., an oven, in combination with a casing, an air receiving pipe therein, means in said casing for heating said pipe, a support in the oven for the article to be treated, a distributer in said oven for the hot air having therein perforations facing said support, and a blower in communication with said pipe adapted to supply the latter with atmospheric air prior to being heated and force the heated atmospheric air in jets through said distributer toward said support.

5. In a device for drying, baking, cooking, etc., an oven in combination with a casing, a pipe therein adapted to receive fresh atmospheric air, means in said casing for heating said pipe, a support of open material in said oven for the article to be treated, a distributer for the heated atmospheric air in the oven adapted to discharge the heated air toward said support and a blower in communication with said pipe in advance of the latter whereby pure atmospheric air in heated condition is directed to said distributer.

WILLIAM FULLARD.

Witnesses:
 JOHN A. WIEDERSHEIM,
 N. BUSSINGER.